United States Patent [19]
Chen et al.

[11] Patent Number: 5,844,031
[45] Date of Patent: Dec. 1, 1998

[54] METHOD OF DISPERSING SILICONE COMPOSITIONS IN ORGANIC THERMOPLASTIC MATERIALS

[75] Inventors: Wei Chen; Hongxi Zhang; Kevin Edward Lupton; David Joseph Romenesko; Randall Gene Schmidt, all of Midland, Mich.

[73] Assignee: Dow Corning Corporation, Midland, Mich.

[21] Appl. No.: 704,061

[22] Filed: Aug. 28, 1996

[51] Int. Cl.$^6$ ...................................................... C08K 5/24
[52] U.S. Cl. ......................... 524/264; 524/265; 524/267; 525/100; 525/104; 525/106; 525/398; 525/431; 525/446; 525/479
[58] Field of Search ..................................... 525/100, 104, 525/106, 431, 398, 446, 479; 524/265, 264, 267

[56] References Cited

U.S. PATENT DOCUMENTS

| | | | |
|---|---|---|---|
| 3,909,475 | 9/1975 | Schneider | 260/29.1 |
| 4,386,179 | 5/1983 | Sterling | 524/269 |
| 4,387,176 | 6/1983 | Frye | 524/268 |
| 4,446,090 | 5/1984 | Lovgren et al. | 264/211 |
| 4,803,244 | 2/1989 | Umpleby | 525/105 |
| 5,346,941 | 9/1994 | Furukawa et al. | 524/268 |
| 5,403,891 | 4/1995 | Romenesko | 525/106 |

OTHER PUBLICATIONS

"Morphology of PE/PDMS Blends: Scanning Electron Microscopy and Accessibility based Characterization" Geerts. Polym. Prepr. 34(2) 805–6 (1993) pp. 805–806.

"Proceedings of The Royal Society" Series A Mathematical and Physical Sciences No. 858 OCt. 1, 1934 vol. 146 pp. 501–523.

"A Study on Polymer Belnding Microcheology: PArt IV. The Influence of Coalescence on Blend Morphology Origination" Elmendorp and VenDerVegt Polymer Engineering and Science, OCt. 1986 vol. 26 No. 19 pp. 1332–1338.

"Formation of Dispersed Phase in Incompatible Polymer Blends: Interfacial and Rheological Effects" Wu Polymer Engineering and Scienced Mid–Mar. 1987 vol. 27 No. 5 pp. 335–343.

*Primary Examiner*—Melvyn I. Marquis
*Attorney, Agent, or Firm*—Arne R. Jarnholm

[57] ABSTRACT

A method of dispersing silicone compositions in organic thermoplastic materials is disclosed. The novel compositions produced by the method of the invention have a fine and relatively uniform dispersion or organosilicone in an organic thermoplastic. An organosilicone resin (A) and a predominantly linear silicone fluid (B) are first blended to substantial homogeneity to form an organosilicone alloy therefrom. The organosilicone alloy exhibits thermoplastic behavior and has a temperature-dependent complex viscosity $\eta^*_{Si}(T)$ associated therewith. Likewise the organic thermoplastic materials have a temperature-dependent complex viscosity, $\eta^*_{OTP}(T)$, associated therewith. The organic thermoplastic and the organosilicone alloy are thereafter mixed at a predetermined mixing temperature, $T_m$, and a predetermined shear strain rate. The organic thermoplastic material and the organosilicone alloy are both in a flowable state at $T_m$. The value of $T_m$ is selected to be about ±30° C. of a temperature, $T_0$, wherein the absolute value of $\{\eta^*_{OTP}(T_0) - \eta^*_{Si}(T_0)\}$ is at its lowest value, at the predetermined shear strain rate.

24 Claims, 4 Drawing Sheets

METHOD OF DISPERSING SILICONE COMPOSITIONS IN ORGANIC THERMOPLASTIC MATERIALS

BACKGROUND OF THE INVENTION

1. Field of the Invention

The present invention relates generally to a method of dispersing silicone compositions in thermoplastic materials and more particularly to such a method wherein the difference between the complex viscosity of the silicone composition and that of the organic thermoplastic material is minimized during mixing.

2. Description of the Prior Art

Organic thermoplastics, such as polyolefins, polyesters, polyamines and polyamides, are well-known materials employed in a variety of applications. For instance, polyolefin and polyester films have been used as packaging materials and fibers of these materials have been made into woven and nonwoven textiles. Polyamines and polyamides are frequently used in applications that require water and oil repellency and high temperature resistance.

Silicone-based materials have been employed in many applications, including the formulation of industrial adhesives, personal care products, textile treatments and abrasion-resistant coatings. One particularly outstanding feature of certain silicone compositions is their ability to provide many substrates with increased hydrophobicity. Certain other silicone compositions have surfactant qualities.

Heretofore, in order to obtain the beneficial properties of silicones in combination with other materials, such as organic thermoplastic fabrics and curable coating compositions, the silicone materials have generally been topically applied to organic thermoplastic substrates or have been chemically incorporated into the structure of the organic materials by forming copolymers therewith.

In many instances, the topical application of a silicone to an organic thermoplastic substrate results in short-lived benefits, because the silicone treatment may wash or wear off. Likewise, when silicone and organic compositions are united through chemical reaction, the resulting copolymer may not always yield the best combination of properties that were present in the starting materials. Furthermore, it is not always possible to form a chemical link between certain silicone and organic compositions.

Physically dispersing silicone compositions throughout the structure of thermoplastic materials has also proved difficult. Attempts to disperse silicones in resin form and silicones in fluid form each have unique drawbacks associated therewith.

As used herein, the term "resin" describes a silicone composition wherein the molecular structure is arranged in a predominantly three dimensional network. In particular, the term "resin" is used herein to designate "MQ" silicone resin. MQ resins are macromolecular polymers comprised primarily of $R_3SiO_{1/2}$ and $SiO_{4/2}$ units (the M and Q units, respectively) wherein R is a functional or nonfunctional, substituted or unsubstituted organic radical. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units. Such resins are frequently produced by the method disclosed in U.S. Pat. No. 2,676,182, Daudt et al., which is incorporated herein by reference.

Accordingly, MQ resins can be represented by the empirical formula:

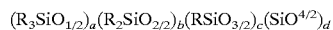

wherein R is as defined above and a and d are positive numerical values and b and c are zero or positive numerical values with the provisos that a+b+c+d=1 and $0 \leq (b+c) \leq 0.2$.

Silicone resins are generally produced in such a manner that the resin macromolecules are dissolved in a solvent, which is typically, but not always, an aromatic solvent. Of course, if one desires to disperse a silicone resin into the structure of another thermoplastic material, such as an organic thermoplastic, the solvent must be removed.

It is known in the art to produce solventless forms of silicone resins. As used herein, the term "solventless" means that substantially all the liquid solvent has been removed from the "solid" resin phase. In U.S. Pat. No. 4,935,484 to Wolfgruber et al., there is disclosed a method for obtaining silicone resin powders by spray-drying aqueous colloidal suspensions of organopolysiloxanes. The process utilizes resins prepared from alkoxysilanes, or the partial hydrolyzate thereof and an emulsifier.

Solventless MQ silicone resins in powder form are not, however, easily blended with other thermoplastics. The MQ resin powders do not themselves exhibit thermoplastic behavior and hence are difficult to disperse in a fine and uniform manner when attempting to formulate blends with organic thermoplastics. Furthermore, silicone resin powders have low bulk density and are difficult to store and handle.

Silicone fluids are difficult to disperse into organic thermoplastics because their viscosities are very low compared to organic thermoplastics and relatively intransigent over the normal range of working temperatures for most organic thermoplastics. Hence, it is difficult to achieve a fine, generally uniform dispersion of silicones throughout the thermoplastic material. Most often, mixing results in large and not particularly uniform silicone domains.

As used herein, the term "silicone fluid" describes a predominantly linear silicone polymer, for example polydimethylsiloxane. The term "fluid" is used in this sense even if the linear polymer contains a minor amount of branched chains or if, at room temperature, the material appears as more of a gum or solid. In other words, the term "fluid" describes only the predominantly linear characteristics of the polymer.

Silicone fluids, then, can be defined as being of the general formula:

wherein x and y are positive numerical values and z is 0 or a positive numerical value with the provisos that x+y+z=1, $y/(x+y+z) \geq 0.8$ and R' is a functional or nonfunctional, substituted or unsubstituted organic radical. It will be understood that silicone fluids may also include reactive or functional groups.

It would therefore be highly desirable to provide a method whereby silicone compositions could be physically dispersed, in a substantially uniform manner and in the form of fine silicone domains, into the other thermoplastic materials, such as organic thermoplastics.

SUMMARY OF THE INVENTION

The above drawbacks of prior attempts to provide a fine and substantially uniform dispersion of silicone compositions in thermoplastic materials are overcome by the method of the present invention. Accordingly, there is provided a method of dispersing silicone compositions in organic thermoplastic materials, the organic thermoplastic materials having a temperature-dependent complex viscosity, $\eta^*_{OTP}(T)$, associated therewith, the method comprising the steps of:

(I) first blending the following components to substantial homogeneity (A) an organosilicone resin of the empirical formula

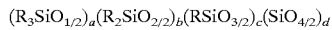
$$(R_3SiO_{1/2})_a(R_2SiO_{2/2})_b(RSiO_{3/2})_c(SiO_{4/2})_d$$

wherein:

a and d are positive numerical values and b and c are zero or positive numerical values with the provisos that a+b+c+d=1 and $0 \leq (b+c) \leq 0.2$ and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 2,000 and about 15,000; and (B) a predominantly linear silicone fluid having the empirical formula

$$(R'_3SiO_{1/2})_x(R'_2SiO_{2/2})_y(R'SiO_{3/2})_z$$

wherein:

x and y are positive numerical values and z is 0 or a positive numerical value with the provisos that x+y+z=1 and $y/(x+y+z) \geq 0.8$; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid having a degree of polymerization greater than about 10;

to form an organosilicone alloy therefrom;

said organosilicone alloy having a temperature-dependent complex viscosity $\eta^*_{Si}(T)$ associated therewith; (II) then mixing said organosilicone alloy formed in step (I) with said organic thermoplastic material at a predetermined mixing temperature, $T_m$ and a predetermined shear strain rate;

said organic thermoplastic material and silicone alloy being flowable at $T_m$; and said predetermined mixing temperature $T_m$ being about ±30° C. of a temperature, $T_0$, wherein the absolute value of $\{\eta^*_{OTP}(T_0) - \eta^*_{Si}(T_0)\}$ is at its lowest value at said predetermined shear strain rate.

In the preferred embodiment of the invention, $T_m$ equals $T_0$ and the absolute value of $\{\eta^*_{OTP}(T_0) - \eta^*_{Si}(T_0)\}$ at the predetermined shear strain rate is zero.

It is therefore an object of the present invention to provide a method of dispersing silicone compositions, in a substantially uniform manner and in the form of fine silicone domains in organic thermoplastics.

It is another object of the present invention to provide a method of dispersing silicone compositions into organic thermoplastics, to produce a novel composition whereby the novel composition has improved properties as compared to the unmodified thermoplastic material.

These and other objects and features and advantages of the present invention will become clear to those skilled in the art from the following detailed description of the invention and accompanying drawings.

DETAILED DESCRIPTION OF THE INVENTION

Figure 1:
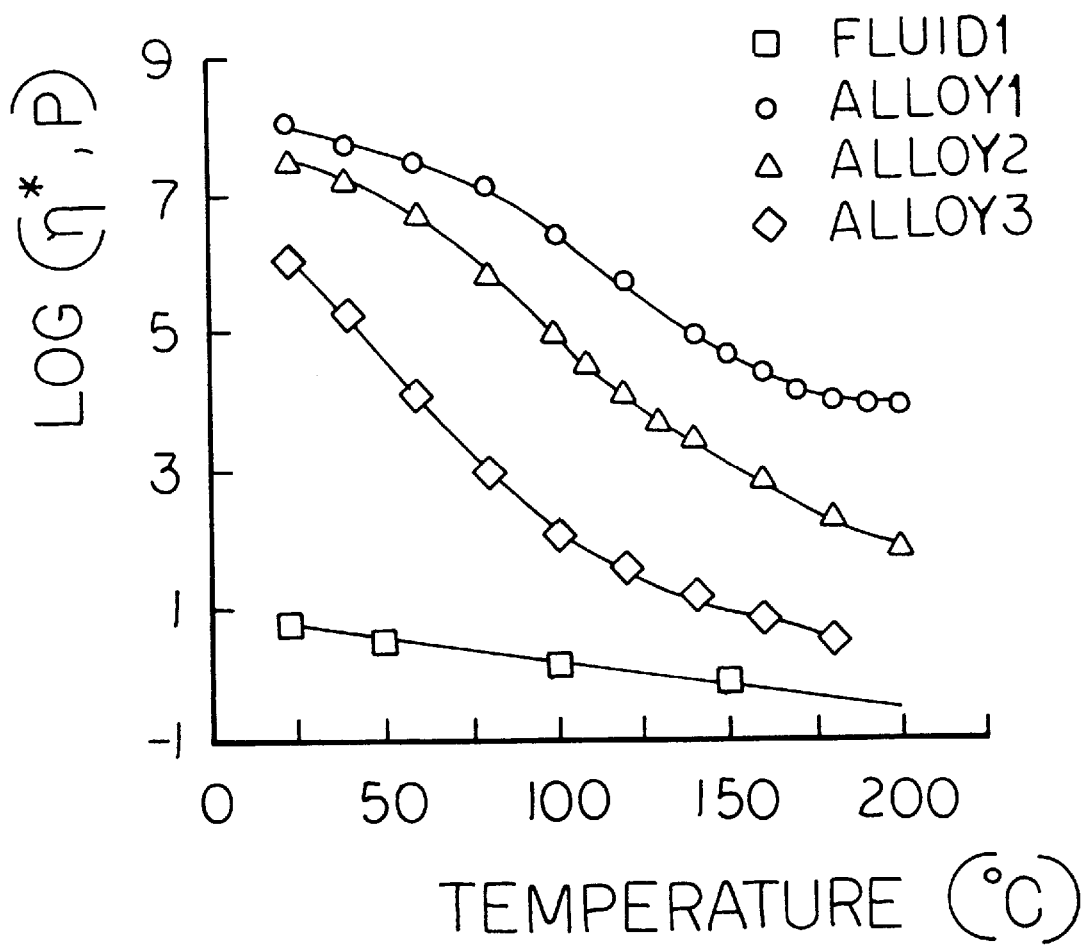
FIG. 1 is a graph of the $\log\eta^*$ (complex viscosity), measured in Poise, as a function of temperature, for three organosilicone alloys (designated ALLOY1, ALLOY2 and ALLOY3) comprised of an MQ organosilicone resin (A) and a dimethylvinylsiloxy-terminated polydimethylsiloxane predominantly linear silicone fluid (B), designated FLUID1, and FLUID1 in the unalloyed condition.

In accordance with the invention, there is provided a method of dispersing silicone compositions, in a substantially uniform manner and in the form of fine silicone domains, into organic thermoplastics. The present inventors have discovered that mixing the silicone composition and organic thermoplastic will yield the aforementioned results when carried out at a predetermined mixing temperature, $T_m$, at which the difference in the complex viscosity of the silicone composition and the organic thermoplastic is substantially minimized.

In the novel method of the invention, the first step (I) comprises blending an organosilicone resin (A) and a predominantly linear silicone fluid (B) to substantial homogeneity so as to form an organosilicone alloy therefrom.

As used herein, the term "organosilicone alloy" describes compositions comprised primarily of a combination of silicone fluids and resins, as described above. When used in a strictly metallurgical sense, the term "alloy" implies the fusion of two or more constituents, at least one of which is metallic, to achieve physical properties that are not independently exhibited by either constituent.

As used herein to characterize an organosilicone composition, the term "alloy," describes blending of two dissimilar silicone polymer constituents to achieve physical properties that are not independently exhibited by the resin (A) or fluid (B). More particularly, silicone resin (A), alone does not exhibit thermoplastic behavior and hence, is not flowable at the working temperatures of most organic thermoplastics. Furthermore, silicone fluids (B) alone, have complex viscosities that are relatively intransigent as a function of temperature. In accordance with the invention, however, silicone alloys, which are a substantially homogeneous blend of a silicone resin (A) and a silicone fluid (B), exhibit thermoplastic behavior. That is to say, the silicone alloys useful in the present invention have a temperature-dependent complex viscosity, $\eta^*_{sf}(T)$, which generally decreases with increasing temperature.

The organosilicone resin (A) of the invention has a number average molecular weight (Mn) between about 2,000 and about 15,000 and the empirical formula:

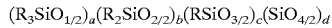

wherein:

a and d are positive numerical values and b and c are zero or positive numerical values with the provisos that a+b+c+d=1 and 0≦(b+c)≦0.2 and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl. The stipulated values assigned to parameters a, b, c, and d defined the "MQ" nature of the resin.

The predominantly linear silicone fluid (B) of the invention has a degree of polymerization greater than about 10 and the empirical formula:

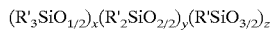

wherein x and y are positive numerical values and z is 0 or a positive numerical value with the provisos that x+y+z=1 and y/(x+y+z)≧0.8; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl.

Predominantly linear silicone fluids (B) are commercially available from most silicone suppliers. For instance, Dow Corning® 3-0065, Dow Corning 200® Fluid (350 and 60,000 centistoke versions) and Dow Corning® SGM 3 gum are all suitable types of predominantly linear silicone fluids (B) and are commercially available from the Dow Corning Corporation of Midland, Mich. Another suitable dimethylhydroxy-terminated fluid is Dow Corning Q3-5016, also available from Dow Corning Corporation, Midland, Mich.

The R and R' groups associated with the organosilicone resin (A) and linear fluid (B), respectively, are selected for the properties that are desired to be incorporated into the organic thermoplastic by the fine and relatively uniform dispersion of the silicone alloy formed therefrom. For instance, if one desires to impart greater hydrophobicity to low density polyethylene, this can be accomplished by using resins (A) and/or fluids (B) wherein the R and/or R' groups include polyethers.

Referring now to FIG. 1, there is illustrated the temperature-dependent behavior of the complex viscosity $\eta^*(T)$ of a dimethylvinylsiloxy-terminated polydimethylsiloxane predominantly linear silicone fluid (B), designated FLUID1, and three different organosilicone alloys comprised of an MQ organosilicone resin (A) and FLUID1. The alloys, designated ALLOY1, ALLOY2 and ALLOY3, were formulated such that the weight ratio of resin (A):fluid (B) was 80:20, 70:30 and 60:40, respectively. Because the value of $\eta^*(T)$, in Poise, may vary by orders of magnitude, the $\log_{10}$ of those values is represented in all the Figures herein.

FLUID1, the dimethylvinylsiloxy-terminated polydimethylsiloxane predominantly linear silicone fluid (B), had a degree of polymerization of about 150, and a room temperature kinematic viscosity of about 450 Cst. FLUID1 is commercially available from the Dow Corning Corporation, of Midland, Mich. and is sold under the designation Dow Corning® 3-0065.

Nuclear magnetic resonance ($^{29}$Si) was used to determine the typical formula of the organosilicone resin (A) used to prepare the above-mentioned alloys. The typical formula includes: about 43 mole % M units of $(CH_3)SiO_{1/2}$; about 12 mole % T units of $(OH)SiO_{3/2}$; and about 45 mole % Q units of $SiO_{4/2}$. Resin-calibrated gel permeation chromatography (GPC) revealed that the number average molecular weight, Mn, generally ranges between about 4,600 and 5,000 and the weight average molecular weight, Mw, ranges between 17,000 and 22,000.

For all alloy systems reported herein, the blending step (I) was carried out in a xylene solution, after which the solvent was removed by heating at 120° C. under vacuum. The compositions were then compression-formed by compression-molding at a temperature of 150° C. under a pressure between 1.5 and 5.0 MPa for 5 minutes, followed by cold-pressing for two minutes. This resulted in compression-formed square slabs approximately 2 mm thick and 10 cm on a side, from which circular test specimens, approximately 2.5 cm in diameter were removed with a punch.

The complex viscosity, $\eta^*$, of each ALLOY composition and FLUID1 was measured on a dynamic mechanical thermal analyzer, model no. RDA-2 having 25 mm parallel plates (available from Rheometrics, Inc. of Piscataway N.J.) Frequency sweeps between 1 radian/second and 100 radians/sec were carried out at different temperatures and at strains which insured linear viscoelastic behavior throughout. The values appearing in FIG. 1 correspond to a frequency of one radian per second.

It should be noted that FIG. 1 demonstrates that the complex viscosity of FLUID1, an unalloyed predominantly linear silicone fluid (A), changes very little from room temperature to about 200° C. The complex viscosity of each ALLOY composition, however, shows considerable change over the same temperature interval. FIG. 1 illustrates that each Alloy composition shows three fairly distinct regions. The first region, at low temperatures, is considered to be a glassy region, showing very high complex viscosities. The second region is considered to be the resin/fluid alloy glass transition region, where the complex viscosity is dropping as a function of increasing temperature. It should be noted that the glass transition region for these alloys may cover a fairly broad temperature range. The final region is that region where the complex viscosity, as a function of temperature, begins to plateau. In this latter region, and in the glass transition region, the alloy compositions are considered to be "flowable" within the meaning of the present invention. The "flowable" condition of most silicone alloys is generally reached at temperatures wherein the value of $\eta^*_{sf}(T)$ is less than $10^8$ about centipoise.

FIG. 1 also shows that the temperature at which the flowable region initiates, decreases as the weight ratio of resin (A):fluid (B) is decreased. Furthermore, the value of the complex viscosity of the alloys at any given temperature is lowered as the weight ratio of resin (A):fluid (B) is decreased.

The present inventors have further discovered that the temperature at which the flowable region is initiated in an organosilicone alloy can also be influenced by the degree of polymerization of the predominantly linear silicone fluid (B) used in the formulation of the alloy. For instance, in alloys formulated from identical organosilicone resins (B) with identical weight ratios of resin (A):fluid (B), those alloys that have fluids with relatively lower degrees of polymerization also tend to exhibit flowable regions at relatively lower temperatures.

Those skilled in the art will appreciate that organic thermoplastics are generally considered as being crystalline, or amorphous. The organic thermoplastic polymers described as crystalline herein typically contain crystalline domains and amorphous domains such that the percent crystallinity is less than 100 percent.

Crystalline organic thermoplastics such as polyamides and polyamines and polyolefins such as polypropylene and polyethylene homopolymers show a characteristic and dramatic drop in complex viscosity over a short temperature range, after which the complex viscosity reaches somewhat of a plateau in the melted state. These organic thermoplastic materials are considered "flowable" within the context of the present invention, only when in the melted state.

Amorphous organic thermoplastics, such as polystyrene and polycarbonate on the other hand, do not show a sharp melting point but rather exhibit increased softening with increased temperatures. For purposes of the present invention, such materials are not considered "flowable" within the context of the present invention, except at temperatures in excess of their glass transition temperatures.

Crystalline and amorphous organic thermoplastics are all considered suitable for use in connection with the present invention. Such thermoplastics include but are not limited to polypropylene, polyethylene and copolymers thereof, polyvinylchloride, polystyrene, acrylonitrile-butadiene-styrene copolymers, polyamides and polyamines, polyesters such as poly(ethylene terephthalate) and poly(butylene terephthalate), acrylics, acetals and fluoroplastics.

Figure 2:
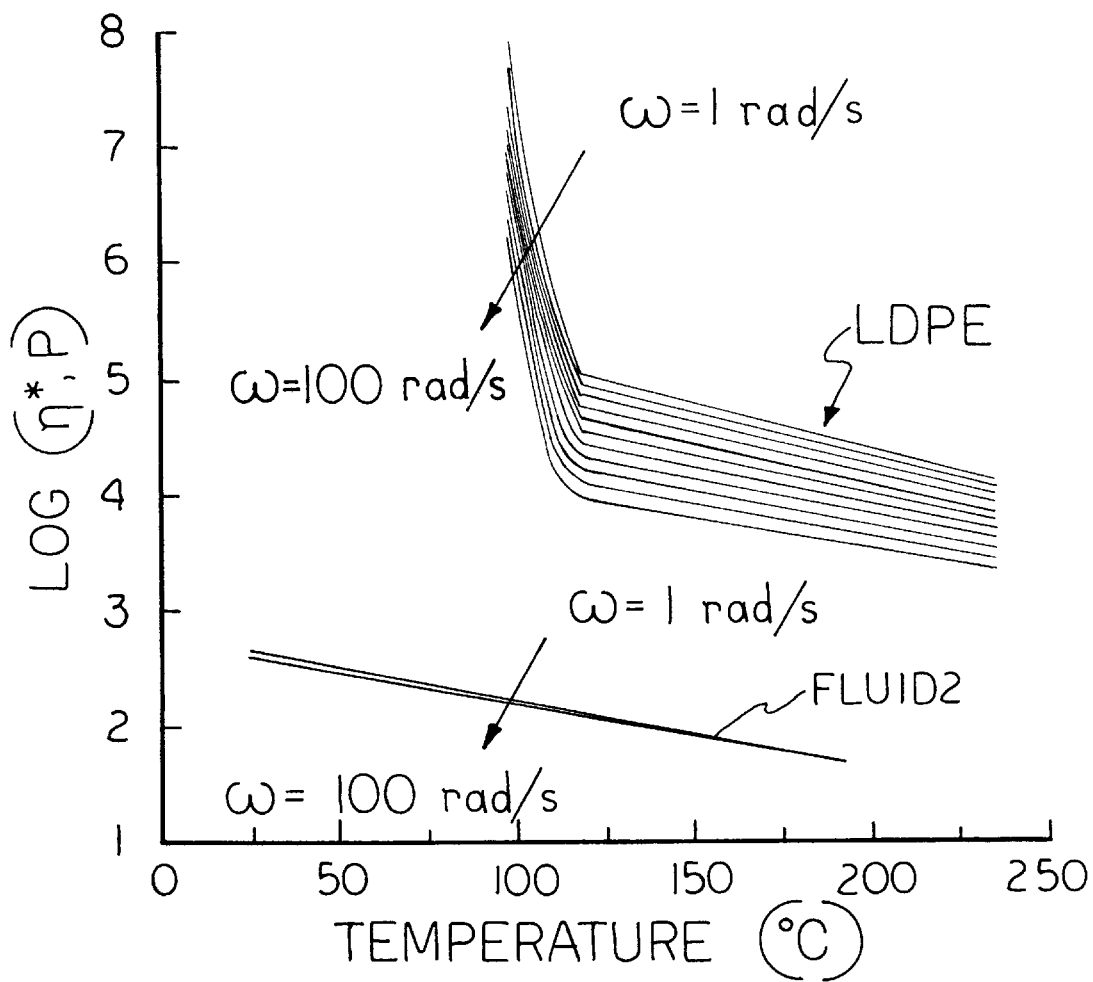
FIG. 2 is a graph of a family of curves of the $\log f^*$ (complex viscosity), measured in Poise and as a function of temperature, at increasing frequency, $\omega$, for low density polyethylene (LDPE) and a dimethylsilanol-terminated polydimethylsiloxane predominantly linear silicone fluid (B), designated FLUID2, in the unalloyed condition.

Referring now to FIG. 2, there is shown a graph of a family of curves of the log$\eta$* (complex viscosity), measured in Poise and as a function of temperature, at increasing frequency, $\omega$, for low density polyethylene (LDPE) and $\alpha$, $\omega$-dimethylsilanol-terminated polydimethylsiloxane predominantly linear silicone fluid (B), designated FLUID2, in the unalloyed condition.

As previously mentioned, polyethylene is a crystalline organic thermoplastic and hence, the LDPE shows a characteristic dramatic drop in viscosity between about 100° C. and 120° C. At temperatures over about 120° C., the LDPE has melted and is in the flowable state.

Frequency sweeps between 1 radian/second and 100 radians/sec on the dynamic mechanical thermal analyzer generated a family of curves, indicating that the complex viscosity of the thermoplastic LDPE is shear strain rate sensitive.

FLUID2 has a degree of polymerization of about 900 and a room temperature kinematic viscosity of about 60,000 cSt. FIG. 2 illustrates that the complex viscosity of FLUID2 is substantially intransigent over temperature and much less shear strain rate sensitive than LDPE.

It should be noted that FIG. 2 shows that the complex viscosity of FLUID2 and the LDPE do not cross at any temperature in the flowable region of the LDPE.

Figure 3:
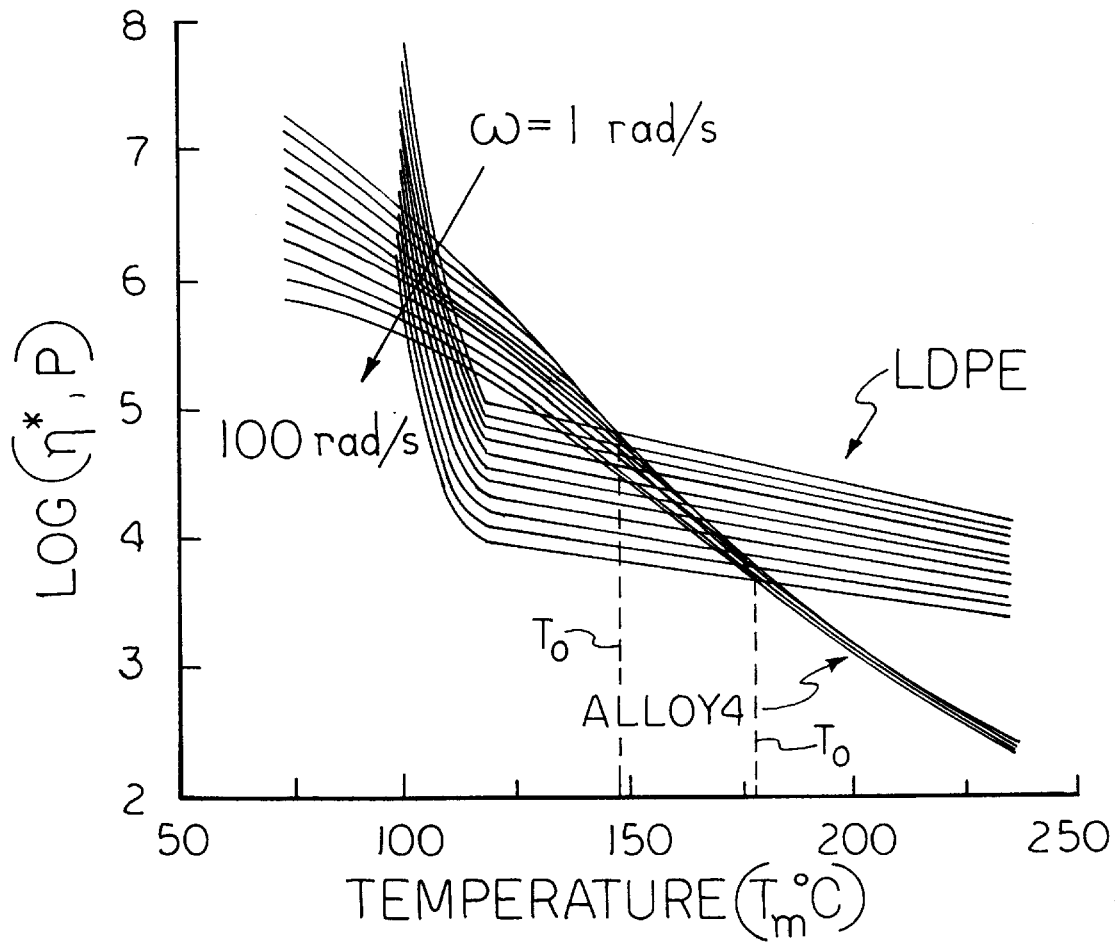
FIG. 3 is a graph identical to that shown in FIG. 2 except that the dimethylsilanol-terminated polydimethylsiloxane predominantly linear silicone fluid (B), FLUID2, has been alloyed with an MQ organosilicone resin (A) in a weight ratio of (A):(B) of 75:25, designated ALLOY4.

Referring now to FIG. 3, there is shown the temperature-dependent behavior of the complex viscosity of an organo-silicone alloy, designated ALLOY4, superimposed on the curves generated for LDPE from FIG. 2. ALLOY4 was prepared from FLUID2 and the previously-described MQ organosilicone resin (A) in a weight ratio of (A):(B) of 75:25. Frequency sweeps between 1 radian/second and 100 radians/sec on the dynamic mechanical thermal analyzer also generated family of curves, illustrating that the complex viscosity of ALLOY4, in the glass transition region, is somewhat shear strain rate sensitive, albeit much less so than the LDPE in the melted state. In particular, it should be noted that the shear strain rate sensitivity is almost negligible in the flowable region of ALLOY4.

For purposes of clarity, the complex viscosity of organic thermoplastics as a function of temperature is designated $\eta^*_{OTP}(T)$ herein. Likewise, the complex viscosity of organosilicone alloys as a function of temperature is designated as $\eta^*_{Si}(T)$.

In accordance with the present invention, an organosilicone composition, in the form of an organosilicone alloy, such as ALLOY4, is mixed with an organic thermoplastic, such as LDPE, at a predetermined mixing temperature, $T_m$, such that, at a given shear strain rate, the absolute value of the difference in complex viscosities associated with the organosilicone alloy and the organic thermoplastic in the flowable regions of both is substantially minimized. The absolute value of the difference in the complex viscosities is clearly at a minimum when the complex viscosities are equal. Accordingly, for a given shear strain rate, ALLOY4 and LDPE are most preferably mixed at a mixing temperature where their respective values of $\eta^*(T)$ cross. That temperature is defined herein as $T_0$. Therefore, in the most preferred embodiment of the invention, $T_m$ equals $T_0$ and the absolute value of $\{\eta^*_{TP}(T_0) - \eta^*_{Si}(T_0)\}$ is zero.

During mixing, the organosilicone alloy and the organic thermoplastic will be subjected to identical shear strain rates. In FIG. 3, the family of curves generated for LDPE and ALLOY4 intersect at $T_0$ which ranges from about 145° C. to about 180° C. for like shear strain rates generated by frequency sweeps between 1 and 100 radians per second. Thus, in the most preferred embodiment of the invention, the predetermined mixing temperature $T_m$ will be between these values for corresponding shear strain rates.

It should be noted that no exact correlation between shear strain rates in mixing and frequency in dynamic thermal analysis has been established. This clearly cannot be done as the shear strain rate during mixing is governed by many factors inherent in the equipment used and the speed at which it is run. However, the present inventors have found that an empirical relationship between sweep frequency and any particular mixing apparatus can generally be readily established, based upon trial and error and judging the uniformity and domain size of the organosilicone dispersion in the organic thermoplastic. Accordingly, $T_0$ can be approximated for a given mixing apparatus.

By way of illustration, ten weight parts of ALLOY4 was dispersed into 90 weight parts of LDPE, utilizing mixing temperatures $T_m$ ranging from 140° C. to 220° C. Mixing was carried out using a Haake System-90 rheometer equipped with a model 600 mixer and roller blades. Mixing speed was maintained at 100 rpm and mixing was continued for 15 minutes at each mixing temperature, $T_m$. Eight samples of the ALLOY4 dispersion in LDPE were run at different values of $T_m$ and the domain sizes measured using scanning electron microscopy.

Figure 4:
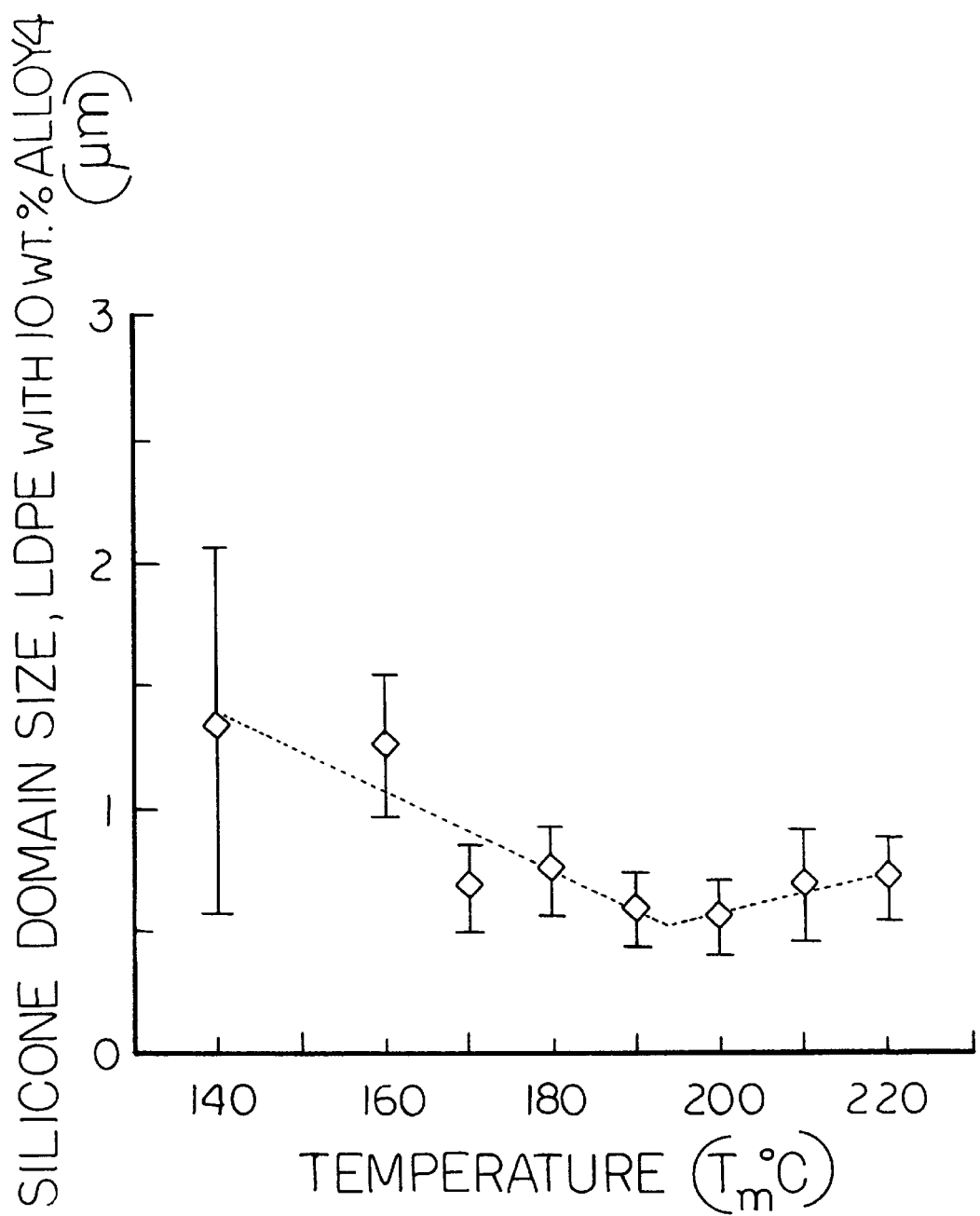
FIG. 4 is graph of silicone domain size ($\mu m$) versus mixing temperature $T_m$ for LDPE having 10 weight percent of organosilicone ALLOY4 dispersed therein. Each diamond point represents the average value of the diameter of the silicone domains and each bar represents the range of such values obtained at each value of $T_m$.

Referring now to FIG. 4, there is illustrated the silicone domain size of ALLOY4, as dispersed in LDPE at 10 weight percent, as a function of mixing temperature $T_m$. Each diamond-shaped data point represents the mean value of the domain size of ALLOY4, the sample run at a given $T_m$. The vertical bar associated with each mean value represents the range of the domain sizes. FIG. 4 clearly shows that the mean silicone domain size of ALLOY4 reaches a minimum at a mixing temperature $T_m$ between about 190° C. and about 200° C. It further shows that the range of the silicone domain sizes decreases in that same temperature interval. Hence, for the dispersion of ALLOY4 in LDPE, at the predetermined shear strain rate encountered in the Haake mixer/extruder at the above settings, $T_0$ occurs between about 190° C. and 200° C.

Referring once again to FIG. 3, it can be seen that $T_0$ clearly increases with increasing shear strain rate. Furthermore, it is known that the Haake mixer/extruder, at the above settings, exerts a greater shear strain rate than that generated in dynamic thermal analysis. Thus, a finding that $T_0$ for the dispersion of ALLOY4 in LDPE in the Haake mixer is between about 190° C. and 200° C., is consistent with the behavior predicted by dynamic thermal analysis.

Referring once again to FIG. 4, it can be seen that a substantially uniform, minimized silicone domain size was achieved at values of $T_m$ between about 160° C. and 220° C. Consistent with this range, the predetermined mixing temperature, $T_m$, in the context of the present invention, is a temperature at which the absolute value of the difference in the complex viscosities of the organosilicone alloy and the organic thermoplastic is substantially minimized. Thus, in accordance with the invention, $T_m$ may vary about ±30° C. about $T_0$. In the preferred embodiment of the invention, $T_m$ is ±about 20° C. of $T_0$. Even more preferred is $T_m$±10° C. Most preferred is $T_m=T_0$.

It should also be noted that not all combinations of organosilicone alloys and organic thermoplastics will have intersecting complex viscosities at a given temperature. In such instances, however, the absolute value of the difference in the complex viscosities of the organosilicone alloy and the organic thermoplastic will reach its lowest value at a single temperature, $T_0$, in the flowable regions.

In the practice of the method of the present invention, it is critical that the blending of the organosilicone MQ resin (A) and the predominantly linear silicone fluid (B) produce an organosilicone alloy that exhibits thermoplastic behavior. Several factors can contribute to the loss of this thermoplastic behavior and an inability to practice the invention.

Unless the resin (A) and fluid (B) are blended to substantial homogeneity, the alloy produced therefrom will not exhibit the desired thermoplastic behavior. Accordingly, in the most preferred embodiment of the invention, the blending of the resin (A) and fluid (B) is carried out in a solvent, which is then stripped from the blend to produce the desired alloy.

As previously mentioned, the MQ organosilicone resin (A) and predominantly linear fluid (B) are also limited in their compositions such that at least sixty mole percent of the monovalent radicals associated therewith, R and R', respectively, must be methyl groups. Unless these limitations are maintained, incompatibility between the resin (A) and fluid (A) make obtaining a substantially homogenous alloy thereof very difficult. Even more preferred, is that the R' groups associated with the silicone fluid (B) be limited to at least eighty percent methyl.

Another factor affecting the ability of homogenous blending is the number average molecular weight $M_n$ of the MQ organosilicone resin. In accordance with the invention, $M_n$ of the MQ resin is between about 2,000 and 15,000 and more preferably between about 3,000 and 7,000.

As previously mentioned, the MQ organosilicone resins (A) are generally prepared in a solution of an organic solvent. When Mn of the MQ resin (A) (as determined by resin-calibrated gel permeation chromatography) is less than about 2,000 the resins retain the characteristics of a liquid, regardless whether they are removed from solution. Hence, forming a blend with a predominantly linear silicone fluid (A) yields an alloy wherein $\eta^*_{Si}(T)$ is relatively intransigent and does not exhibit thermoplastic behavior.

When Mn is less than about 3,000, the alloys formed therefrom exhibit a fair amount of tackiness at ambient temperatures. Hence, they are somewhat difficult to handle.

When Mn is greater than about 7,000, it again becomes difficult, but not impossible to blend the resins (A) with the predominantly linear silicone fluids (B) to a substantially homogeneous state.

When Mn is greater than about 15,000, the resins (A) begin to lose their solubility in most solvents and tend to include significant amounts of gel, thus prohibiting blending with fluids (B) to a substantially homogeneous state.

The predominantly linear silicone fluids (B) use in the method of the present invention, are limited to those having a degree of polymerization of at least 10, and more preferably 100 and greater. It has been found that very low molecular weight fluids are generally too volatile to withstand mixing at the desired $T_m$.

Another factor that affects the ability of the organosilicone alloy to exhibit thermoplastic behavior is the ratio of resin (A):fluid (B). The present inventors have discovered that a substantially homogeneous blend of about 23 to about 50 parts, by weight, of MQ organosilicone resin (A) to each 10 parts, by weight, of a linear silicone fluid (B), yields an organosilicone alloy that will exhibit the necessary thermoplastic behavior.

Also in the most preferred embodiment of the invention, the organosilicone alloy produced from the blending step (I) of the organosilicone resin (A) and predominantly linear silicone fluid (B) is in the form of pellets. The manufacture of silicone alloys in pellet form is disclosed in copending U.S. patent application Ser. No. 705,106, now U.S. Pat. No. 5,708,098 entitled METHOD OF PREPARING SOLVENTLESS, THERMOPLASTIC SILICONE PELLETS AND THE PELLETS SO-PRODUCED, which application is filed of even date herewith and is incorporated in its entirety herein. Pellets of the organosilicone alloy provide a convenient way to handle and meter the desired amount of organosilicone alloy that is to be. dispersed in an organic thermoplastic in a manner according to the present invention.

In another embodiment of the invention, the organosilicone alloy can be dispersed into the organic thermoplastic in a concentration that is higher than that desired in the end product. In this manner, a master batch of organosilicone alloy-bearing organic plastic can be made and stored for later dilution and further mixing.

Those skilled in the art will appreciate that the compositions of organic thermoplastics and organosilicone alloys fix their complex viscosity as a function of temperature. Thus, it is possible that for an organosilicone alloy of a given composition, a particular organic thermoplastic may undergo degradation at $T_0$, or vice versa.

Therefore, as a practical matter, it may be desirable to shift $T_0$, thus effecting a corresponding shift in $T_m$. Further, it may be desirable to reduce the magnitude of the absolute value of $\{\eta^*_{OTP}(T_0)-\eta^*_{Si}(T_0)\}$, so that more pronounced benefits of the method of the invention (e.g. uniform distribution in the form of fine organosilicone domains) are realized. This can be accomplished in at least three different ways:

1. Varying the weight ratio of the organosilicone resin (A) to the predominantly linear silicone fluid (B) in the organosilicone alloy;
2. Varying the degree of polymerization of the predominantly linear silicone fluid (B) of the organosilicone alloy; and 3. Varying the number average or weight average molecular weight (and hence the polydispersity) of the organosilicone resin (A) used in the organosilicone alloy.

Practicing the novel method of the present invention results in novel compositions of organic thermoplastics characterized by the uniform distribution of organosilicones, in fine silicone domains. FIG. 4 illustrates that average domain sizes for the organosilicone alloys in LDPE can be less than one μm±about 0.25 μm. Heretofore, it has been very difficult, and in the instance of certain relatively low molecular weight silicone fluids impossible, to achieve a silicone domain size of less than about 5 μm in an organic thermoplastic.

As much or as little organosilicone as is desired may be dispersed into an organic thermoplastic. For instance, amounts as small as 500 parts per million may be incorporated into LDPE in order to provide lubricity during extrusion of the same. As a practical matter, however, there is an upper limit to the amount of organosilicone alloy that can be dispersed into an organic thermoplastic. At some point, outside the scope of the present invention, the silicone phase ceases to be a discontinuous phase dispersed in a continuous phase of an organic thermoplastic. Nonetheless, it is contemplated that compositions having up to about 500,000 parts per million by weight of silicone dispersion, and more, may be made in accordance with the invention.

The composition produced in accordance with the present invention can have many applications. For instance, the organic thermoplastic materials having a fine and relatively uniform dispersion of silicone domains therein can be extruded and blown into sheet products or molded or cast into articles of manufacture. Likewise, they can be drawn into fiber and made into nonwoven fabrics or spun to produce yarns from which fabrics may be woven, each of which it anticipated will exhbit novel characteristics, depending upon the organofunctionality associated with the resin (A) and fluid (B).

The preceding invention has been described in detail, by way of example, so as to point out the particular features and advantages thereof. The scope of the present invention is not, however, to be construed as being so-limited, and should be judged solely on the following claims and equivalents thereof.

What is claimed is:

1. A method of dispersing silicone compositions in organic thermoplastic materials, the organic thermoplastic materials having a temperature-dependent complex viscosity, $\eta^*_{OTP}(T)$, associated therewith, the method comprising the steps of:

(I) first blending the following components to substantial homogeneity:

(A) an organosilicone resin of the empirical formula $$(R_3SiO_{1/2})_a(R_2SiO_{2/2})_b(RSiO_{3/2})_c(SiO_{4/2})_d$$

wherein:

a and d are positive numerical values and b and c are zero or positive numerical values with the provisos that a+b+c+d=1 and 0≦(b+c)≦0.2 and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 2,000 and about 15,000; and (B) a predominantly linear silicone fluid having the empirical formula $$(R'_3SiO_{1/2})_x(R'_2SiO_{2/2})_y(R'SiO_{3/2})_z$$

wherein:

x and y are positive numerical values and z is 0 or a positive numerical value with the provisos that x+y+z=1 and y/(x+y+z)≧0.8; and R' is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R' groups may be the same or different, with the proviso that at least sixty mole percent of said R' radicals are methyl;

said predominantly linear silicone fluid (A) having a degree of polymerization greater than about 10;

to form an organosilicone alloy therefrom;

said organosilicone alloy having a temperature-dependent complex viscosity $\eta^*_{Si}(T)$ associated therewith; (II) then mixing said organosilicone alloy formed in step (I) with said organic thermoplastic material at a predetermined mixing temperature, $T_m$ and a predetermined shear strain rate;

said organic thermoplastic material and silicone alloy being flowable at $T_m$; and said predetermined mixing temperature $T_m$ being about ±30° C. of a temperature, $T_0$, wherein the absolute value of $\{\eta^*_{OTP}(T_0)-\eta^*_{Si}(T_0)\}$ is at its lowest value at said predetermined shear strain rate.

2. A method in accordance with claim 1 wherein said organosilicone resin (A) has a number average molecular weight (Mn) between about 3,000 and about 7,000.

3. A method in accordance with claim 1 wherein said predominantly linear silicone fluid (B) has a degree of polymerization greater than about 100.

4. A method in accordance with claim 3 wherein said predominantly linear silicone fluid (B) is a gum.

5. A method in accordance with claim 1 wherein said blending step (I) is carried out in a cosolvent and further comprising the step of removing said cosolvent before carrying out said mixing step (III).

6. A method in accordance with claim 1 wherein the organosilicone alloy produced from said blending step (I) is in the form of a plurality of pellets.

7. A method in accordance with claim 1 wherein said predetermined mixing temperature $T_m$ is about ±20° C. of $T_0$.

8. A method in accordance with claim 1 wherein said predetermined mixing temperature $T_m$ is about ±10° C. of $T_0$.

9. A method in accordance with claim 1 wherein said predetermined mixing temperature $T_m=T_0$.

10. A method in accordance with claim 1 wherein said organic thermoplastic material is selected from the group consisting of polypropylene, polyethylene and copolymers thereof, polyvinylchloride, polystyrene, acrylonitrile-butadiene-styrene copolymers, polyamides and polyamines, polyesters, acrylics, acetals and fluoroplastics.

11. A method in accordance with claim 1 wherein 23 to 50 parts, by weight, of said organosilicone resin (A) are blended with each 10 parts of said predominantly linear silicone fluid (B).

12. A composition comprising an organic thermoplastic having an organosilicone alloy dispersed therein, said composition being made in accordance with the method of claim 1.

13. A composition in accordance with claim 12 wherein said organosilicone alloy comprises between about 500 and 500,000 parts per million, by weight, of said composition.

14. A composition in accordance with claim 12 wherein said organic thermoplastic material is selected from the group consisting of polypropylene, polyethylene and copolymers thereof, polyvinylchloride, polystyrene, acrylonitrile-butadiene-styrene copolymers, polyamides and polyamines, polyesters, acrylics, acetals and fluoroplastics.

15. A composition in accordance with claim 12 wherein said organosilicone alloy comprises about 23 to about 50 parts, by weight, of said organosilicone resin (A) and about 10 parts, by weight, of said predominantly linear silicone fluid (B).

16. A composition in accordance with claim 12 wherein said silicone composition is dispersed in said organic thermoplastic material in an average domain size less than about 5 μm.

17. A composition in accordance with claim 16 wherein said silicone composition is dispersed in said organic thermoplastic material in an average domain size less than about 1 μm.

18. An article of manufacture comprising a sheet product made from the composition of claim 12.

19. An article of manufacture comprising a molded article made from the composition of claim 12.

20. An article of manufacture comprising a fiber made from the composition of claim 12.

21. An article of manufacture in accordance with claim 20 comprising a nonwoven fabric made from said fiber.

22. An article of manufacture in accordance with claim 20 comprising a spun yarn made from said fiber.

23. An article of manufacture in accordance with claim 20 comprising a textile woven from said spun yarn.

24. A method in accordance with claim 1 wherein at least eighty mole percent of said R' radicals are methyl.

* * * * *